Patented Aug. 25, 1931

1,820,483

UNITED STATES PATENT OFFICE

IWAN OSTROMISLENSKY, OF NEW YORK, N. Y., ASSIGNOR TO THE PYRIDIUM CORPORATION, OF NEW YORK, N. Y., A CORPORATION OF NEW YORK

METHOD OF OBTAINING AN AZO COMPOUND FROM PHENYL-DIAZO-AMINO-ALPHA-MONAMINO-PYRIDINE

No Drawing. Original application filed September 23, 1927, Serial No. 221,628. Divided and this application filed June 9, 1928. Serial No. 284,282.

This invention is an improvement in methods of obtaining a substance composed of phenyl-azo-alpha-alpha-diamino-pyridines.

One of the primary objects of the invention is the provision of a method for preparing the substance, that is, phenyl-diazo-amino-alpha-monamino-pyridine hydrochloride, that is, from the substance forming the subject matter of my copending application serial No. 221,628, filed on Sept. 23, 1927, of which the application is a division.

This substance is obtained by coupling phenyl-diazonium salt with alpha-alpha-diamino-pyridine, under certain conditions, by means of which there is obtained phenyl-diazo-amido-alpha-monamino-pyridine. The product is obtained not only when coupling is performed in an aqueous medium acidified with an organic acid, such as acetic acid, but likewise when an insufficient amount of mineral acid, such as hydrochloric acid, is used.

The compound appears in fine, prismatic, yellowish brown crystals, and dissolves very easily in aniline and in pyridine. It comprises in its structure the following grouping:—

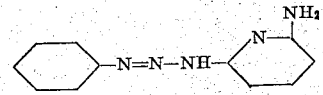

The most striking feature of the hydrochloride of the phenyl-diazo-amino-alpha-monamino-pyridine compound is the excessive facility with which they are converted to the corresponding azo-amido compounds, that is, phenyl-azo-alpha-alpha-diamino-pyridine hydrochloride.

For this purpose it is sufficient to boil the given hydrochloride with pure distilled water for from one-half to two hours. In this time the original hydrochloride dissolves in water and are quantitatively converted into phenyl-azo-alpha-alpha-diamino-pyridine hydrochloride, in accordance with the following reaction:—

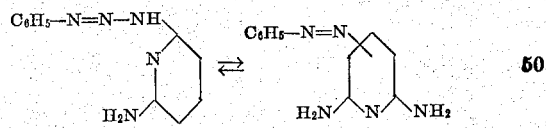

Even free phenyl-diazo-amino-alpha-monamino-pyridine with a melting point of 117° C., is easily converted to the phenyl-azo-alpha-alpha-diamino-pyridine. For this purpose, it is sufficient to boil it with distilled water with a reflux condenser.

The phenyl-diazo-amino-alpha-monamino-pyridine hydrochloride described above is easily converted into phenyl-azo-diamino-pyridine hydrochloride, in boiling water, and by the stomach juices when ingested by the mouth.

What is claimed as new is:—

1. The method of obtaining phenyl-azo-diamino-pyridine hydrochloride, which consists in boiling the hydrochloride of phenyl-diazo-amino-alpha-monamino-pyridine with a solvent.

2. The method of obtaining phenyl-azo-diamino-pyridine hydrochloride, which consists in boiling the hydrochloride of phenyl-diazo-amino-alpha-monamino-pyridine with water.

3. The method of obtaining phenyl-azo-diamino-pyridine hydrochloride, which consists in reacting phenyl-diazonium salt with alpha-alpha-diamino-pyridine in a weakly acidified aqueous medium, and afterwards boiling the product in a solvent.

Signed at New York city, in the county of New York and State of New York this 7th day of June A. D. 1928.

IWAN OSTROMISLENSKY.